US009764883B2

(12) United States Patent
Nakamura

(10) Patent No.: US 9,764,883 B2
(45) Date of Patent: Sep. 19, 2017

(54) HOSE CLAMP

(71) Applicant: TOGO SEISAKUSYO CORPORATION, Aichi-gun, Aichi (JP)

(72) Inventor: Yuji Nakamura, Aichi (JP)

(73) Assignee: TOGO SEISAKUSYO CORPORATION, Aichi-Gun, Aichi (JP)

( * ) Notice: Subject to any disclaimer, the term of this patent is extended or adjusted under 35 U.S.C. 154(b) by 0 days.

(21) Appl. No.: 15/031,891

(22) PCT Filed: Oct. 31, 2013

(86) PCT No.: PCT/JP2013/079505
§ 371 (c)(1),
(2) Date: Apr. 25, 2016

(87) PCT Pub. No.: WO2015/063906
PCT Pub. Date: May 7, 2015

(65) Prior Publication Data
US 2016/0264327 A1    Sep. 15, 2016

(51) Int. Cl.
*F16L 33/02*            (2006.01)
*B65D 63/04*            (2006.01)
(Continued)

(52) U.S. Cl.
CPC .............. *B65D 63/04* (2013.01); *B25B 7/04* (2013.01); *B25B 7/16* (2013.01); *B25B 27/205* (2013.01);
(Continued)

(58) Field of Classification Search
CPC ..... B65D 63/04; F16B 2/243; Y10T 24/1478; Y10T 24/148; Y10T 24/1484; F16L 33/03
See application file for complete search history.

(56) References Cited

U.S. PATENT DOCUMENTS 5,185,907 A * 2/1993 Kawashima ............ F16L 33/03
                                            24/20 CW
5,596,790 A   1/1997 Moeller
                     (Continued)

FOREIGN PATENT DOCUMENTS

CN      101347103 A    1/2009
CN      102317670 A    1/2012
                     (Continued)

OTHER PUBLICATIONS

International Search Report for PCT/JP2013/079505, dated Dec. 3, 2013 in English and Japanese Language.
(Continued)

*Primary Examiner* — Robert J Sandy
*Assistant Examiner* — Michael Lee
(74) *Attorney, Agent, or Firm* — Smith, Gambrell & Russell, LLP

(57) ABSTRACT

A hose clamp includes a clamp body formed by bending a plate spring into an annular shape while two ends of the plate spring are caused to cross, grip tabs formed to be raised radially outward from both ends of the clamp body, respectively and an expanded-diameter state retainer formed integrally on the clamp body or the tabs and capable of retaining an expanded-diameter state of the clamp body and releasing the clamp body from the expanded-diameter state by relative movement of both tabs in an axial direction of the clamp body with a gripping operation applied to both tabs. The tabs have respective distal ends, one of which has a larger width than the other. The distal ends are bent circumferentially outward into bent portions spaced from each other. The bent portions are insertable into positioning recesses formed in opposite surfaces of a gripping tool, respectively.

4 Claims, 14 Drawing Sheets

(51) Int. Cl.
*F16L 33/03* (2006.01)
*B25B 7/04* (2006.01)
*B25B 7/16* (2006.01)
*B25B 27/20* (2006.01)
*F16B 2/24* (2006.01)

(52) U.S. Cl.
CPC .............. *F16B 2/243* (2013.01); *F16L 33/03* (2013.01); *Y10T 24/148* (2015.01); *Y10T 24/1478* (2015.01)

(56) References Cited

U.S. PATENT DOCUMENTS

| | | | | |
|---|---|---|---|---|
| 5,819,376 | A * | 10/1998 | Kovalsky | F16L 33/03 24/20 CW |
| 6,192,555 | B1 * | 2/2001 | Nakamura | F16L 33/03 24/20 CW |
| 8,171,603 | B2 | 5/2012 | Nakamura | |
| 8,931,143 | B2 | 1/2015 | Nakamura | |
| 9,057,459 | B2 * | 6/2015 | Krauch | F16L 33/021 |
| 2009/0049656 | A1 * | 2/2009 | Morita | F16L 33/03 24/20 R |
| 2010/0083472 | A1 | 4/2010 | Nakamura | |
| 2013/0291345 | A1 * | 11/2013 | Nakamura | F16L 33/03 24/20 R |
| 2014/0068897 | A1 * | 3/2014 | Nakamura | F16L 33/03 24/20 S |

FOREIGN PATENT DOCUMENTS

| | | |
|---|---|---|
| DE | 102007017881 A1 | 10/2008 |
| JP | 2003-090474 A | 3/2003 |
| JP | 2008-256142 A | 10/2008 |
| JP | 2013-145048 A | 7/2013 |
| WO | 2012/095990 A1 | 7/2012 |

OTHER PUBLICATIONS

Chinese Office Action for Application No. 201380080492 dated Nov. 21, 2016 with English Translation (11 pages).
Chinese Search Report for Application No. 201380080492 dated Nov. 1, 2016 with English Translation (2 pages).
Chinese Office Action issued Apr. 26, 2017 in Chinese Patent Application No. 201380080492.3 (13 pages including translation).
Japanese Office Action dated May 30, 2017 in Japanese Patent Application No. 2015-544709 (6 pages including translation).

* cited by examiner

HOSE CLAMP

TECHNICAL FIELD

The present invention relates to a hose clamp.

BACKGROUND ART

Undermentioned Patent Document 1 discloses a hose clamp formed by annularly bending a plate spring into an annular shape so that two ends thereof are caused to cross on a circumferential plane. A pair of grip tabs are raised from the ends of the hose clamp respectively. The grip tabs are gripped by a gripping tool so that a diameter of the entire hose clamp is expanded. One of the grip tabs is provided with an arch shaped open groove thereby to be formed into a double-legged shape. The other grip tab is formed into a one-legged shape without opening. A locking claw is formed near a root of the one-legged grip tab so as to protrude radially outward. The two-legged grip tab is formed with a catch capable of locking the locking claw. The locking claw is thus locked by the catch, whereby the hose clamp can be retained in an expanded-diameter state by the locking claw and the catch.

PRIOR ART DOCUMENT

Patent Documents

Patent Document 1: Japanese Patent Application Publication No. JP-A-2008-256142

SUMMARY OF THE INVENTION

Problem to Be Overcome By the Invention

Both grip tabs are formed into a flat plate shape in the conventional hose clamps. The gripping tool for gripping the grip tabs has gripping surfaces which are also formed into a planar shape. Accordingly, both the gripping tool and the grip tabs are merely in a plane-to-plane contact with each other in a gripping operation. Accordingly, there is no guarantee that the gripping tool correctly grips entire surfaces of the grip tabs, and there can be a case where the grip tabs are gripped only partially. Furthermore, it can be assumed that the grip tabs are displaced in a planar direction during the gripping operation even though being correctly gripped initially.

Thus, the conventional hose clamps have a possibility that the postures of the hose clamps in the gripping operation would become unstable. When the posture of the hose clamp in the gripping operation becomes unstable, there is a possibility that the hose clamp would clamp a hose while the hose clamp is inclined. In this case, it is concerned that a sufficient sealability cannot be obtained.

The present invention was made in view of the foregoing circumstances and an object thereof is to provide a hose clamp which can stabilize the posture thereof during the gripping operation and can be assembled to a counterpart to be clamped, in a correct posture.

Means for Overcoming the Problem

A hose clamp according to the present invention includes a clamp body formed by bending a plate spring into an annular shape while two ends of the plate spring are caused to cross on a circumferential plane, grip tabs formed to be raised radially outward from both ends of the clamp body, respectively, and an expanded-diameter state retainer which is formed integrally on the clamp body or the grip tabs and is capable of retaining an expanded-diameter state of the clamp body and releasing the clamp body from the expanded-diameter state by relative movement of both grip tabs in an axial direction of the clamp body with a gripping operation applied to both grip tabs. In the hose clamp, one of the grip tabs has a distal end formed to be wider than a distal end of the other grip tab. The distal ends of the grip tabs are bent in respective directions that the distal ends depart from each other with respect to a thicknesswise direction, thereby serving as bent portions for the gripping operation, respectively.

Effect of the Invention

According to the invention, both grip tabs have distal ends with widths set to be narrower and wider, respectively. The reason for this is that in the case where both grip tabs are formed to be wide, both grip tabs need to be axially displaced with respect to the clamp body when the clamp body is bent into an annular shape with the result that the processing becomes troublesome and the clamp body is sometimes distorted. In addition, when the bending of the clamp body is accompanied by distortion, influences of distortion remain after the processing, which influences can become a cause for reduction in the sealing performance for a counterpart to be clamped.

On the other hand, since both grip tabs are gripped by the gripping tool, the posture of the gripped hose clamp becomes more stable when the grip tabs are formed to be wide. In this background, one of the grip tabs is formed to be wider in the invention. Consequently, the distortion of the clamp body can reliably be reduced in the invention, with the result that the counterpart can be clamped in good conditions. Furthermore, when a gripping tool has operating surfaces formed with respective recesses and the distal ends of the grip tabs are inserted into the respective recesses, the grip tabs can be prevented from positional displacement, so that the gripping can stably be carried out. Consequently, the hose clamp can be assembled to the counterpart to be clamped, in a correct posture.

MODE FOR CARRYING OUT THE INVENTION

Figure 1:
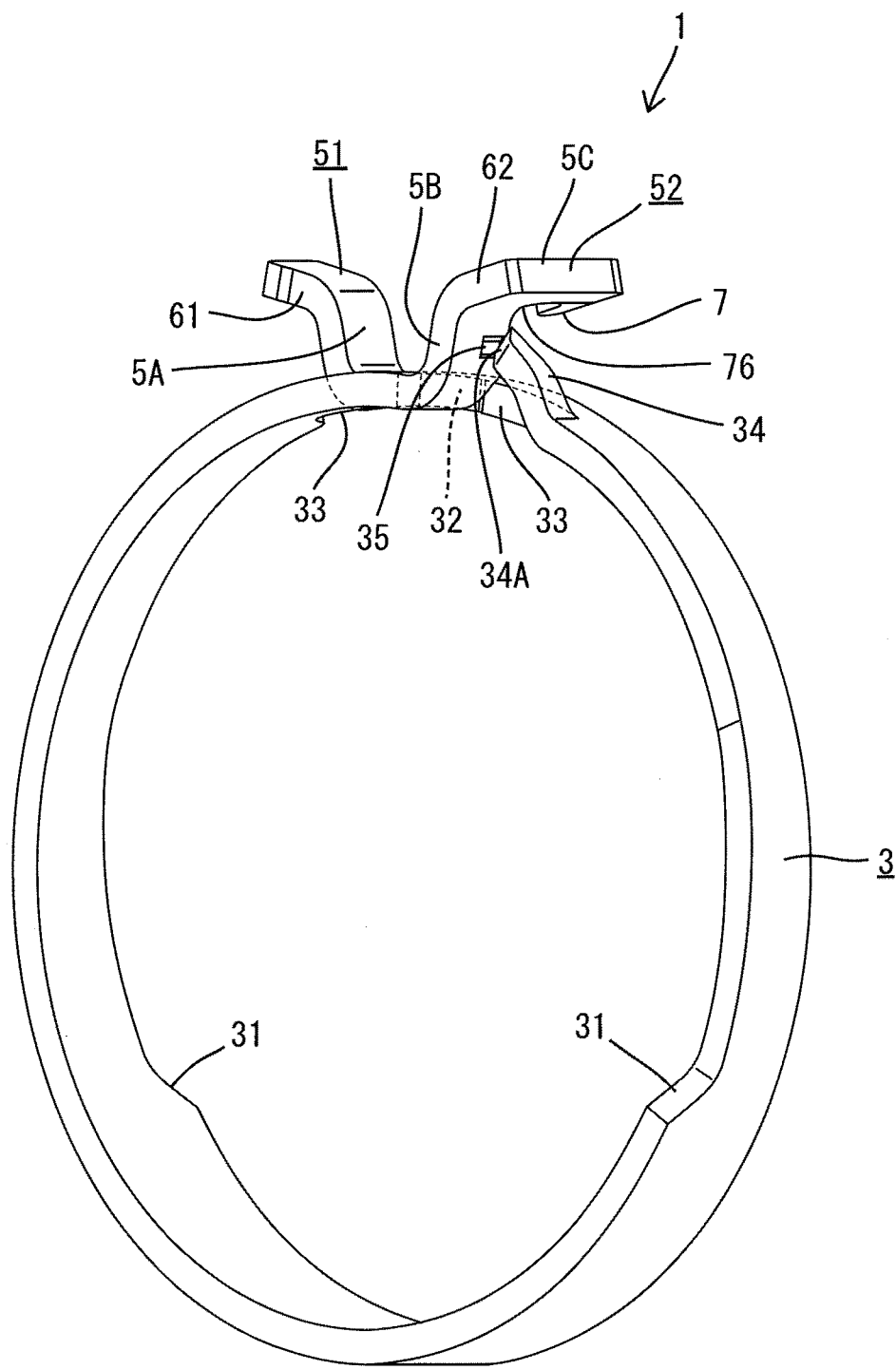
FIG. 1 is a perspective view of the hose clamp according to an embodiment, in an expanded-diameter state.
Figure 2:
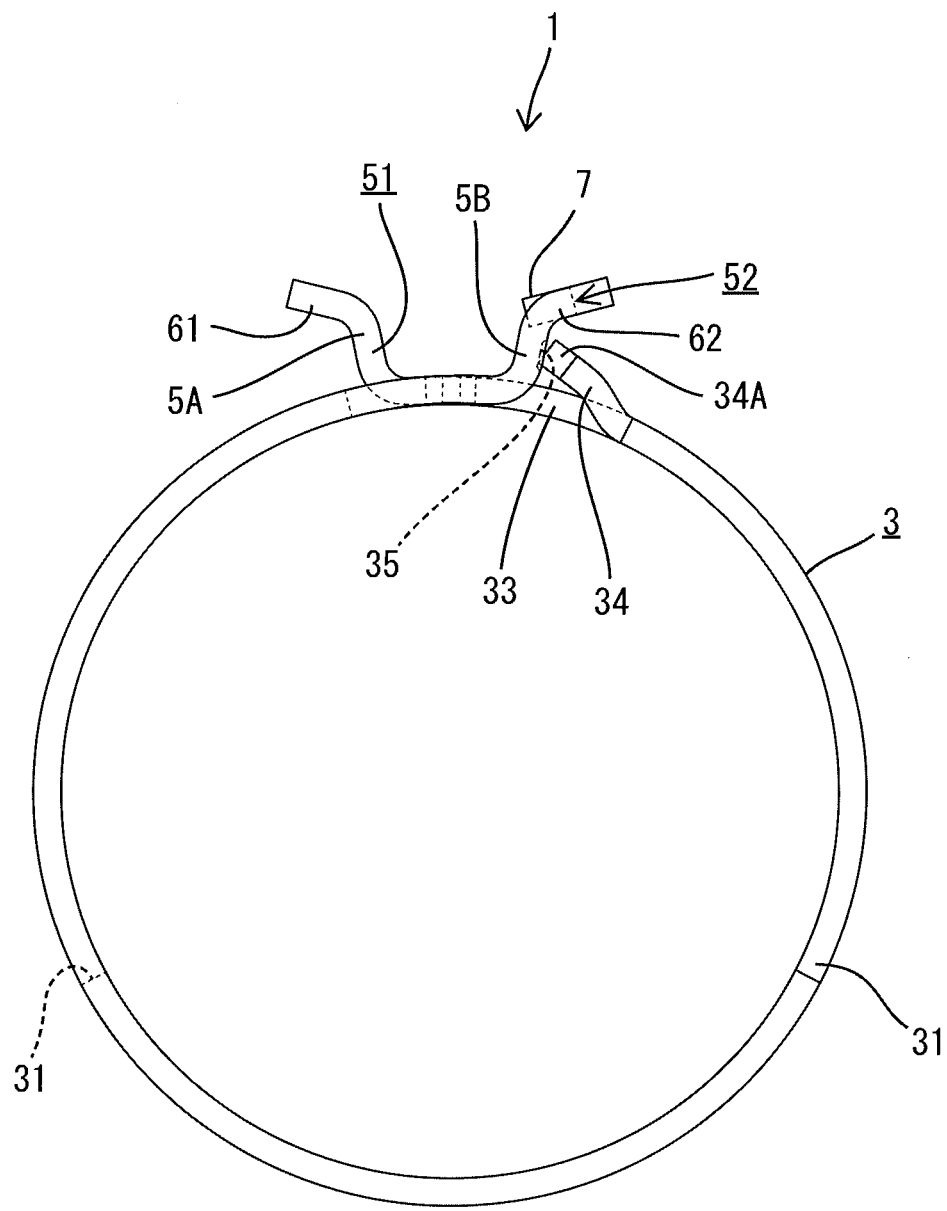
FIG. 2 is a front view of the hose clamp.
Figure 3:
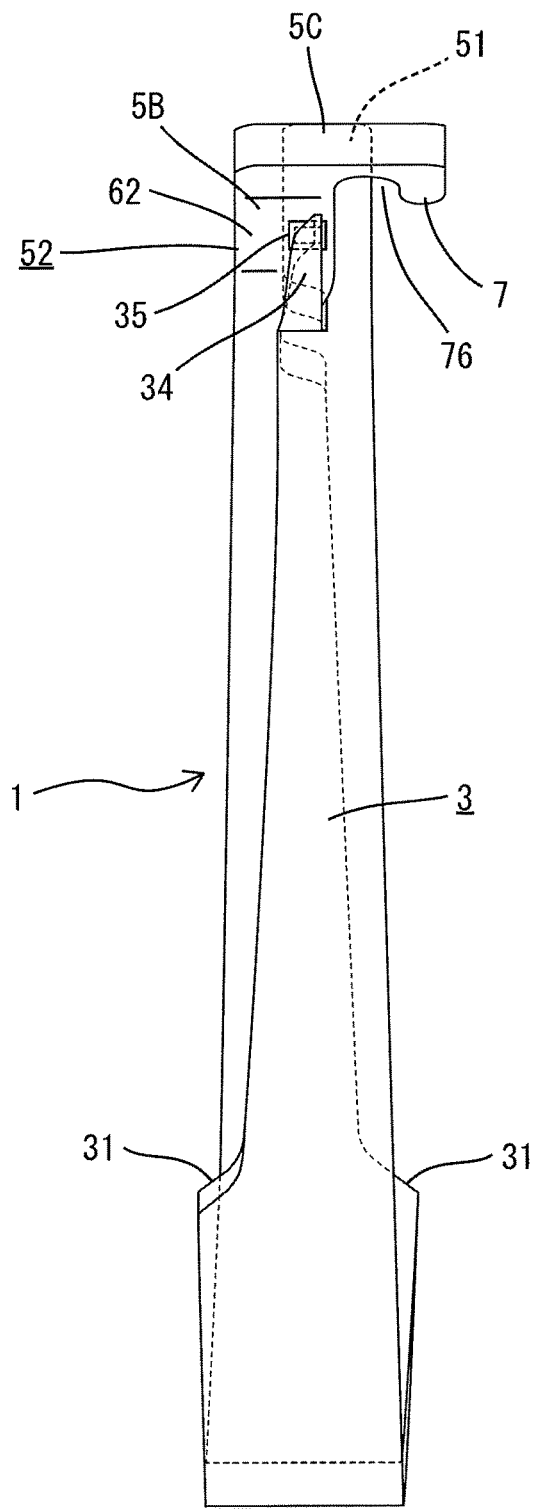
FIG. 3 is a side elevation of the hose clamp.

Preferred embodiments of the invention will be described.

(1) In the hose clamp of the invention, one of the grip tabs may be formed with a limiting piece directed toward the other grip tab. The limiting piece may be configured to abut against the other grip tab while the clamp body is releasable from the expanded-diameter state by way of the expanded-diameter state retainer.

According to this construction, both grip tabs come near to each other with the result that the limiting piece abuts against the other grip tab when both grip tabs are gripped while the hose clamp is in the expanded-diameter state. Since the hose clamp is released from the expanded-diameter state by way of the expanded-diameter state retainer at this point of time, the hose clamp automatically reduces its diameter thereafter, whereby the counterpart can be clamped and fixed. More specifically, the worker can release the clamp body from the expanded-diameter state by using the abutment of the limiting piece against the other grip tab as criterion for judgement. Accordingly, the worker is not required to be skillful. Furthermore, the abutment of the limiting piece against the grip tab can avoid an excessive gripping operation.

(2) The limiting piece may be formed on the grip tab with the wider distal end.

According to this construction, a widthwise space for provision of the limiting piece can easily be ensured in the grip tab with the wider distal end and the freedom in the forming of the limiting piece can be improved accordingly.

(3) The expanded-diameter state retainer may include a locking claw which is formed on a part of the clamp body so as to protrude radially outward, the part being located near the end of the clamp body at the side where the grip tab with the narrower distal end is formed, and a catch formed on a raised portion raised radially outward from the clamp body in the grip tab with the wider distal end, the catch releasably locking the locking claw, thereby retaining the expanded-diameter state of the clamp body. The grip tab with the wider distal end may extend in a widthwise direction from a distal end of the raised portion and may include an extending end which is bent toward the grip tab with the narrower distal end thereby to be formed into the limiting piece. A guide groove may be formed between the raised portion and the limiting piece so as to be open toward the grip tab with the narrower distal end. The guide groove may be configured to be capable of guiding a diameter-reducing operation of the clamp body by allowing a distal end of the locking claw to pass therethrough in transition of the clamp body from the expanded-diameter state to a reduced-diameter state.

According to this construction, when both grip tabs are gripped in the expanded-diameter state of the clamp body, the grip tabs are axially moved relative to each other, so that the locking claw is released from the locking by the catch with the result that the clamp body transits to the reduced-diameter state. In this case, the locking claw passes through the guide groove formed between the raised portion and the limiting piece in the grip tab with the wider distal end. More specifically, since the axial movement of the locking claw is limitable between the raised portion and the limiting pieces defining the guide groove, a normal assembly posture is ensured while the clamp body is avoided from being assembled to the counterpart in the distorted state.

(4) The clamp body in the expanded-diameter state may have an inner diameter smaller than an outer diameter of a counterpart to be clamped.

When this construction is compared with the case where the inner diameter of the clamp body in the expanded-diameter state is set to be larger than the outer diameter of the counterpart, the stress acting on the clamp body is reduced. This can alleviate permanent set in fatigue of the hose clamp.

First Embodiment

Figure 8:
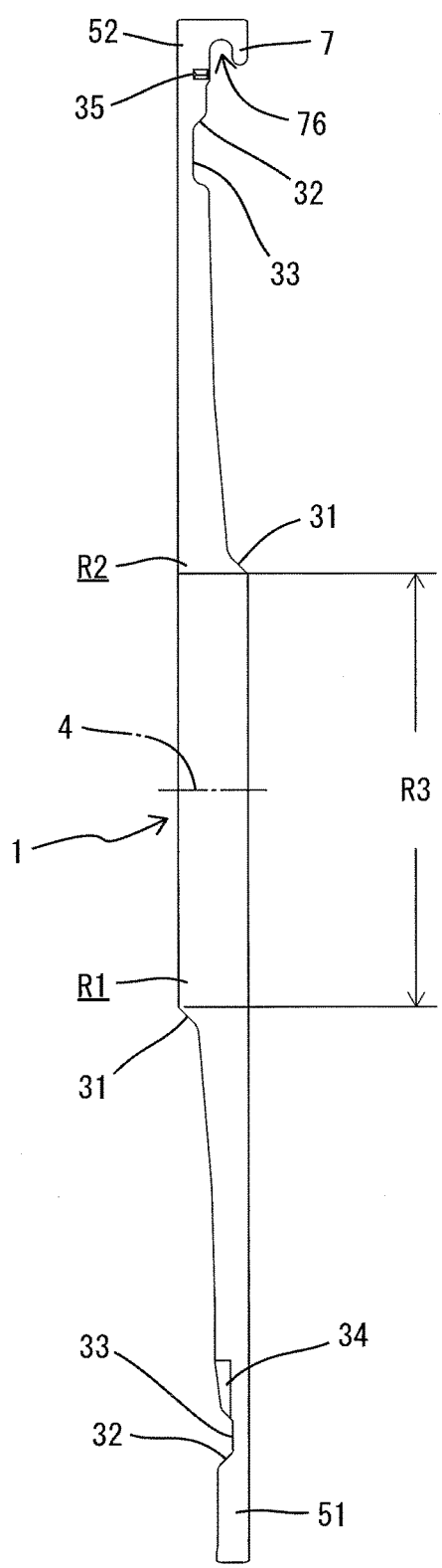
FIG. 8 is a developed view of the hose clamp.
Figure 9:
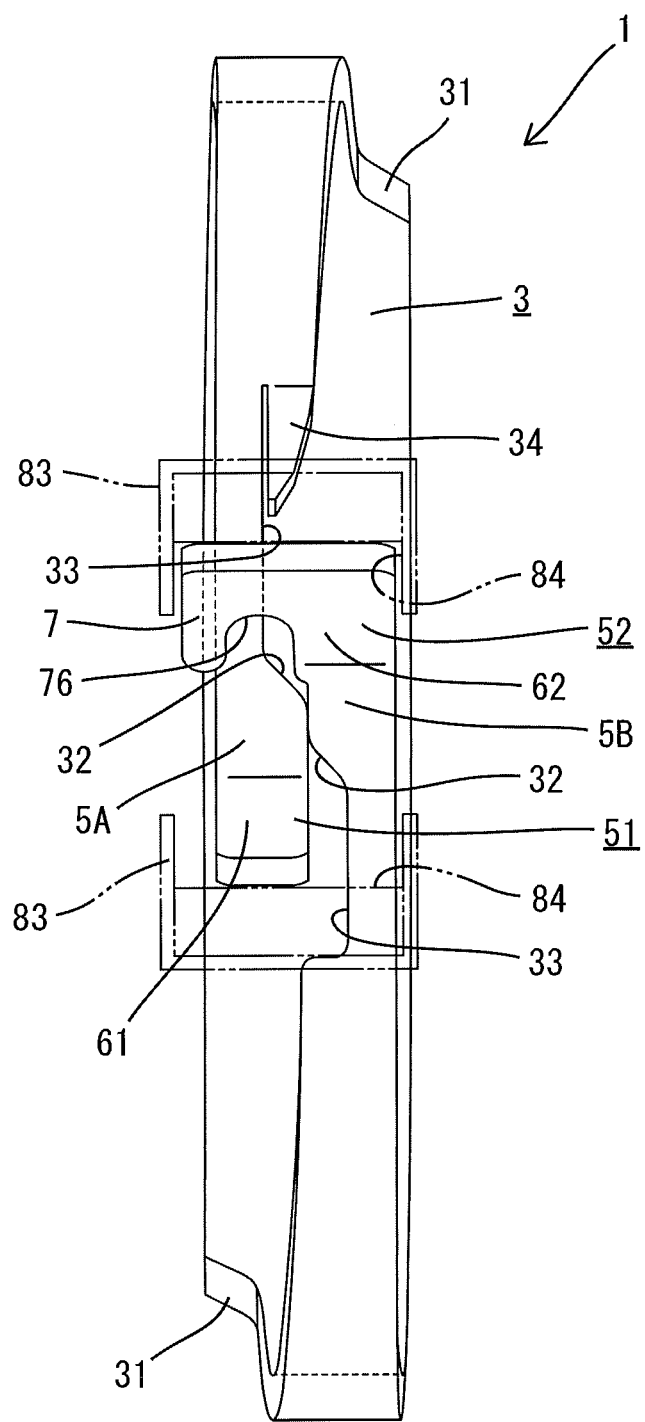
FIG. 9 is a plan view of the hose clamp immediately after having been released from the expanded-diameter state.

A first embodiment embodying the invention will be described with reference to the accompanying drawings. A hose clamp 1 of the embodiment is formed of a metal plate spring as an integral body. The hose clamp 1 is formed in the shape of a long band plate as shown in FIG. 8. In the following description, a region of the hose clamp 1 lower than a lengthwise central axis 4 as shown in the figure will be referred to as "a first region R1" and a region of the hose clamp 1 higher than the lengthwise central axis 4 will be referred to as "a second region R2." A region defined by points upwardly and downwardly away from the central axis 4 by a predetermined equidistance will be referred to as "a third region R3" as shown in FIG. 8. The third region R3 has the largest and uniform width. The region R3 is configured to constitute approximately one third of a circular part when the hose clamp 1 is bent into the annular shape.

Stepped edges 31 are formed at respective boundaries between the centrally-located uniform-width region R3 and parts continuous to both end sides of the hose clamp 1, that is, at side edges opposed to each other. The stepped edges 31 have respective inclined surfaces parallel to each other. One side edge at the side without stepped edges 31 extends linearly from the uniform-width region R3 to a distal end. The other side edge with the stepped edges 31 (hereinafter, "a side edge at the reduced-width side") is formed so that a width thereof is gradually reduced in a predetermined length range from the uniform-width region R3 to the distal end side. More specifically, the first and second regions R1 and R2 are formed to be substantially symmetric with respect to the central axis 4.

Recesses 33 are formed in the side edges at the reduced-width sides near the distal ends of the first and second regions R1 and R2 respectively. The plate spring is annularly bent from the developed state as shown in FIG. 8 into an annular shape so that the bending originates the lengthwise central axis 4 as a starting point, whereby the clamp body 3 is formed by the annular part. Both ends of the hose clamp 1 are configured to cross on a circumferential plane when the hose clamp 1 is annularly bent. As shown in FIG. 8, each one of the recesses 33 has both lengthwise side edges formed into inclined surfaces which are outwardly flared. The inclined surface located at the distal end side functions as a sliding guide edge 32 in each recess 33. When the hose clamp 1 is to be released from the expanded-diameter state as will be described later, the sliding guide edges 32 of the recesses 33 are brought into sliding contact with each other by the gripping operation of the grip tabs 51 and 52 which will be described in the following, so that both ends of the hose clamp 1 can be displaced axially (in a direction such that the grip tabs 51 and 52 are departed from each other).

Figure 4:
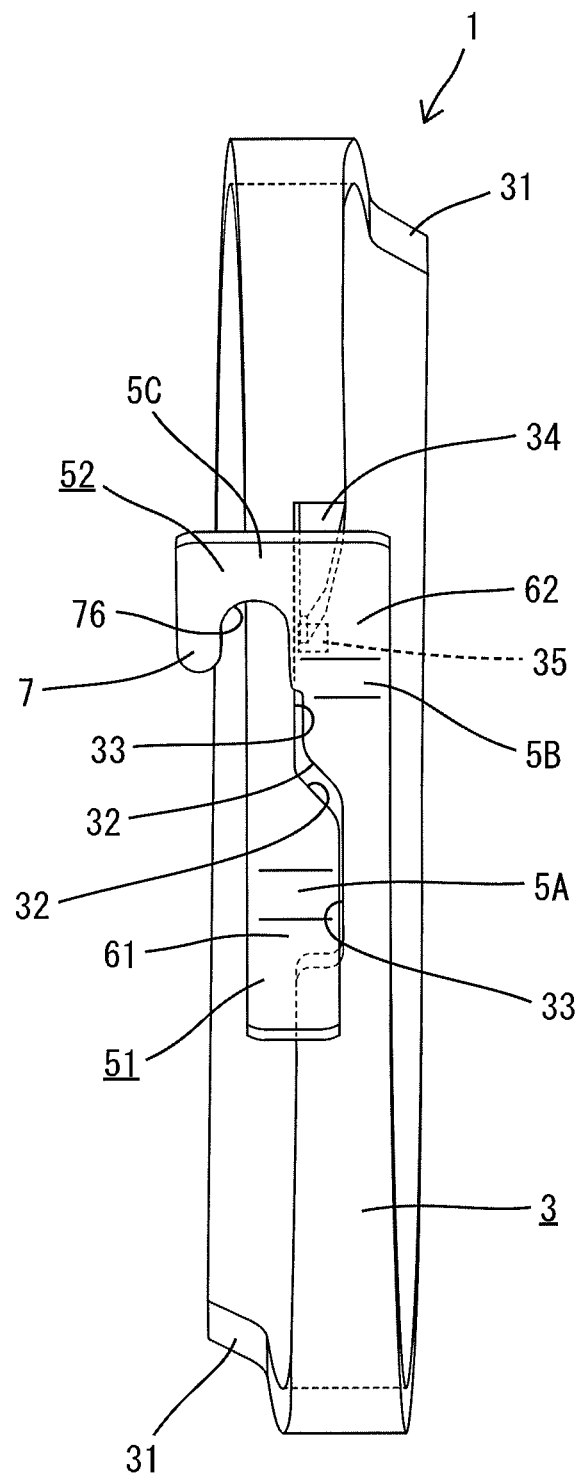
FIG. 4 is a plan view of the hose clamp.
Figure 5:
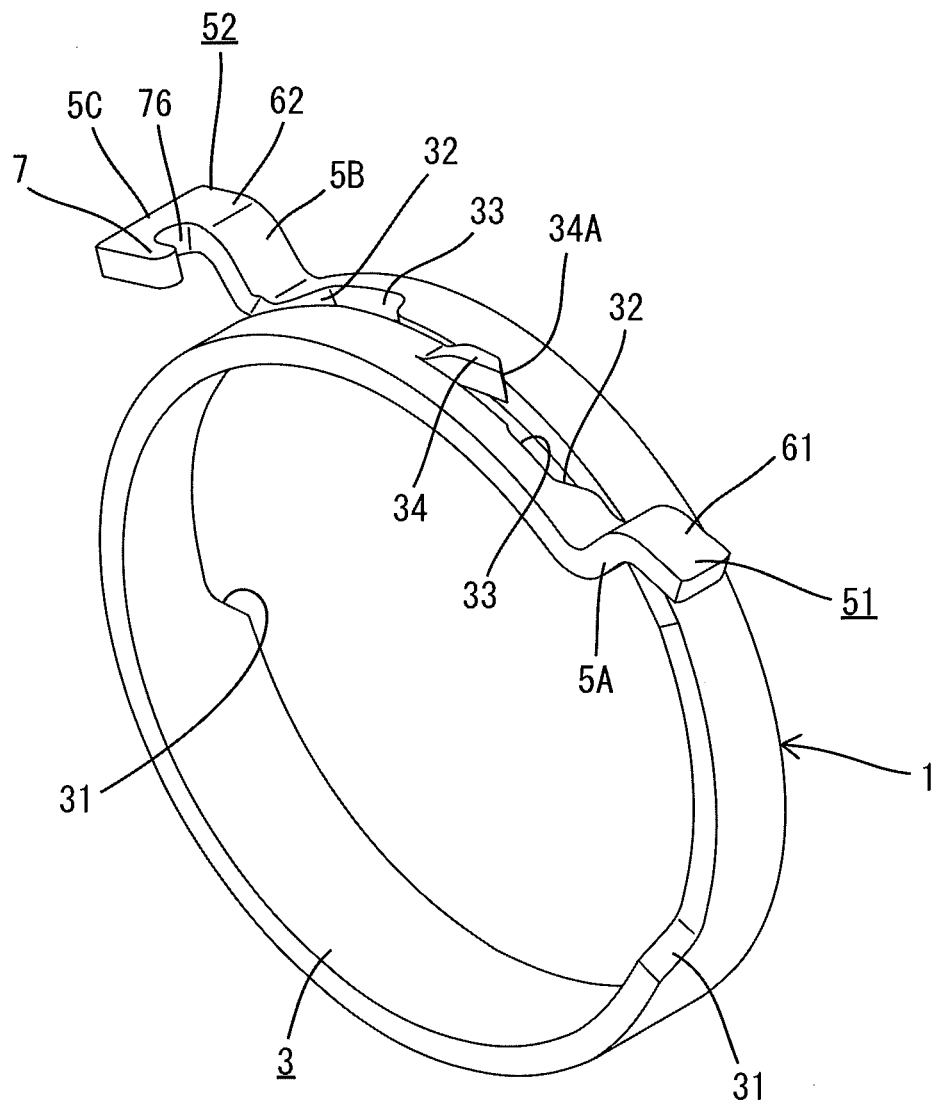
FIG. 5 is a perspective view of the hose clamp in a diameter-reduced state.
Figure 6:
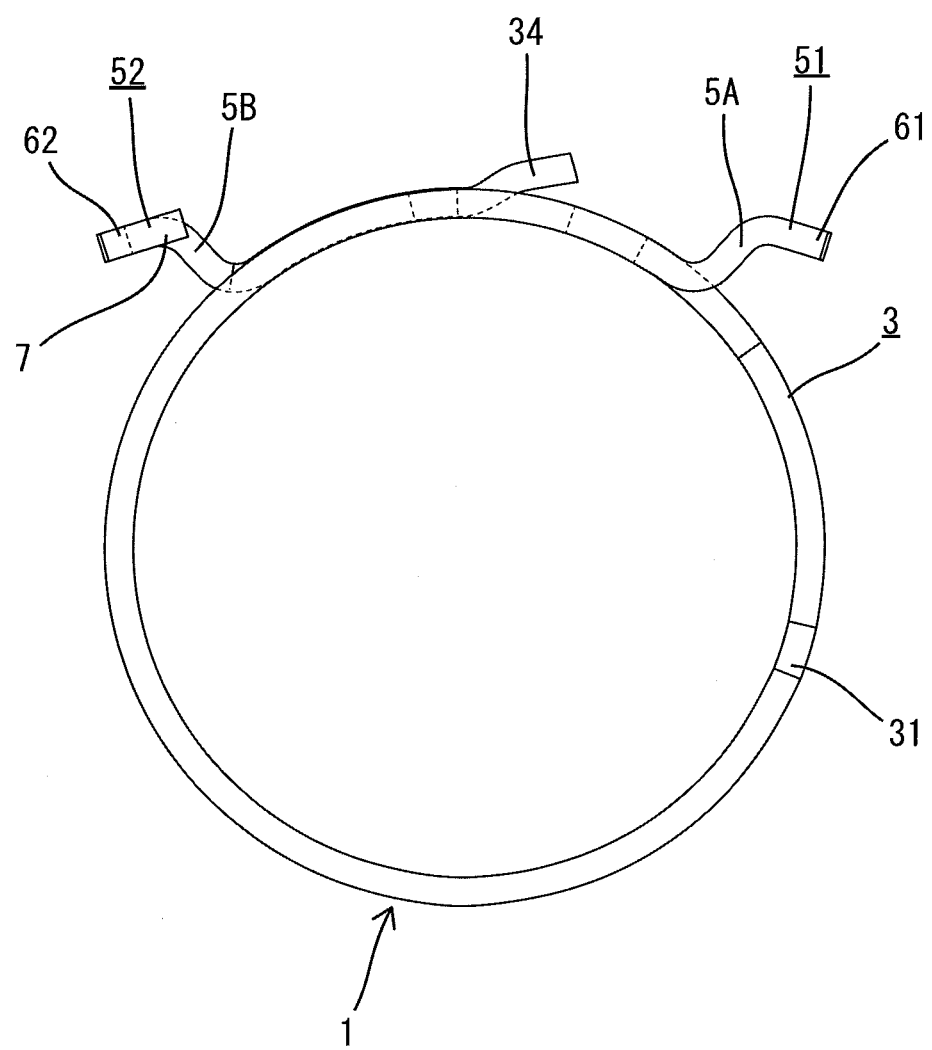
FIG. 6 is a front view of the hose clamp.
Figure 7:
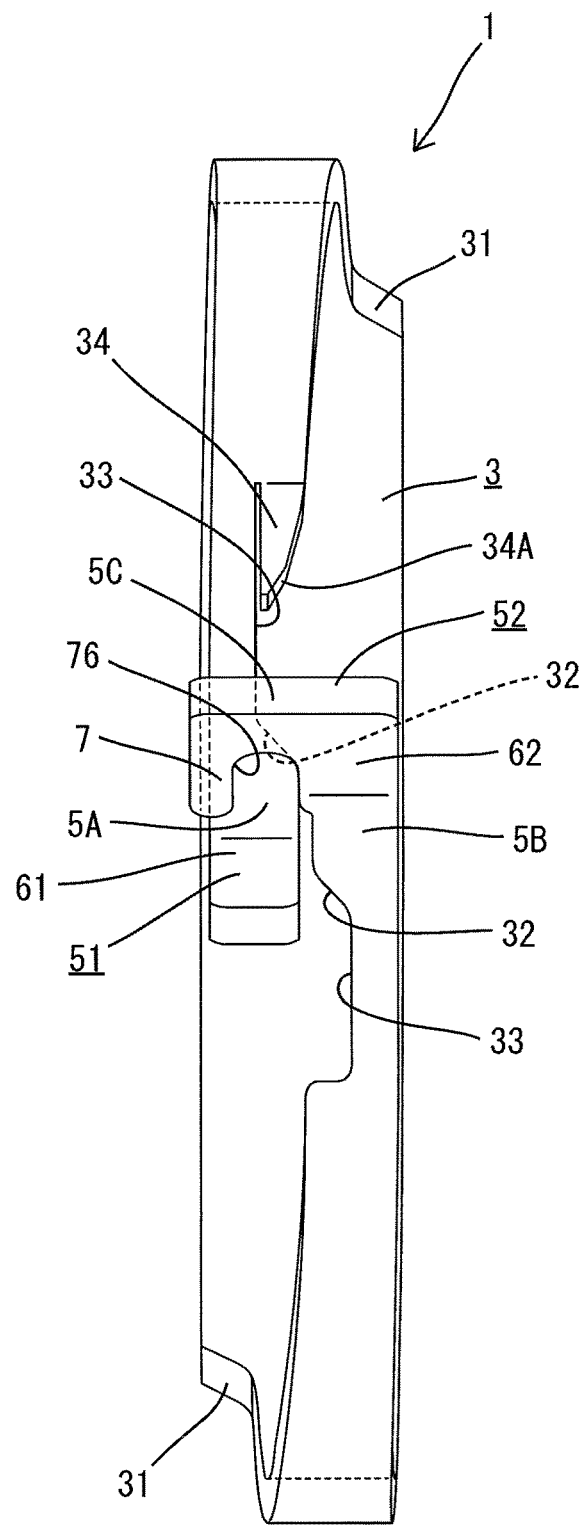
FIG. 7 is a plan view of the hose clamp, showing the case where the hose clamp in the expanded-diameter state has been gripped to be released from the expanded-diameter state.

Both ends of the hose clamp 1 are bent radially outward thereby to be raised, so that both ends are formed so as to stand up into the first and second grip tabs 51 and 52, respectively. When the hose clamp 1 is in an expanded-diameter state which will be described later, root portions of the grip tabs 51 and 52 are configured to be fittable into the recesses 33 located in the regions where the grip tabs 51 and 52 are not formed, respectively, as shown in FIG. 4.

The first region R1 includes a region which extends from the recess 33 to the distal end side and is formed to have a uniform width. Accordingly, the first grip tab 51 located at the distal end side slightly away from the recess 33 is also formed to have a uniform width on the whole. As shown in FIG. 1 and the like, the first grip tab 51 includes a first tapered surface raised radially outward from the clamp body 3 and a first bent portion 61 bent circumferentially outward (in the direction opposite to the second grip tab 52) from a distal end of the first raised portion 5A substantially at a right angle (precisely, at a slightly obtuse angle).

Furthermore, a locking claw 34 is disposed in the recess 33 of the first region R1 so as to be continuous to the inclined surface located opposite the sliding guide edge 32, as shown in FIG. 1 and the like. The locking claw 34 is formed by cutting and raising the side edge at the reduced-width side. The locking claw 34 has an end which is located at the recess 33 side and serves as a free end. The locking claw 34 constitutes an expanded-diameter state retainer together with a catch 35 provided at the second grip tab 52 side. When the locking claw 34 is lockedby the catch 35, the expanded-diameter state retainer can retain the expanded-diameter state of the hose clamp 1 (the state as shown in FIG. 1 and the like). In the embodiment, an inner diameter of the clamp body 3 is set to be slightly larger than an outer diameter of a hose serving as a counterpart to be clamped.

The second grip tab 52 is formed in the second region R2 to be located at the distal end side away from the recess 33, as shown in FIG. 8. The second grip tab 52 has a second raised portion 5B raised radially outward from the clamp body 3 as shown in FIG. 1 and the like. The second raised portion 5B has a small depression formed at the circumferentially outer surface side. The depression is formed into the catch 35 releasably locking the distal end of the locking claw 34.

Figure 10:
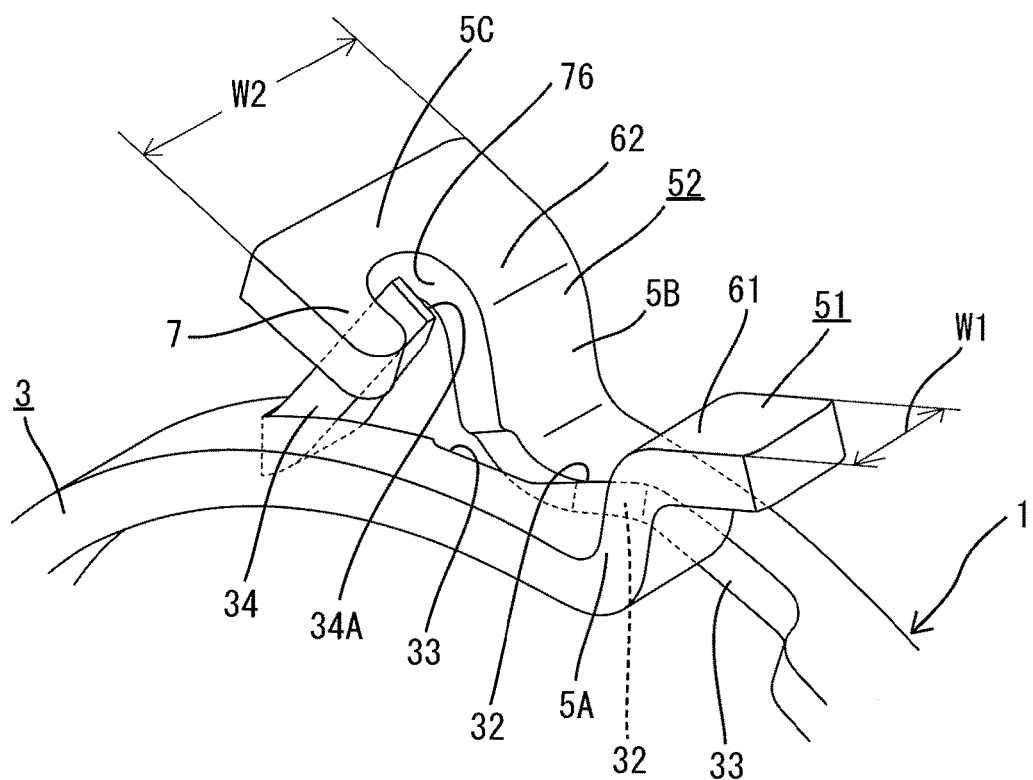
FIG. 10 is an enlarged perspective view of the hose clamp, showing the state where the locking claw has entered the guide groove so that the diameter-reducing operation is guided.
Figure 11:
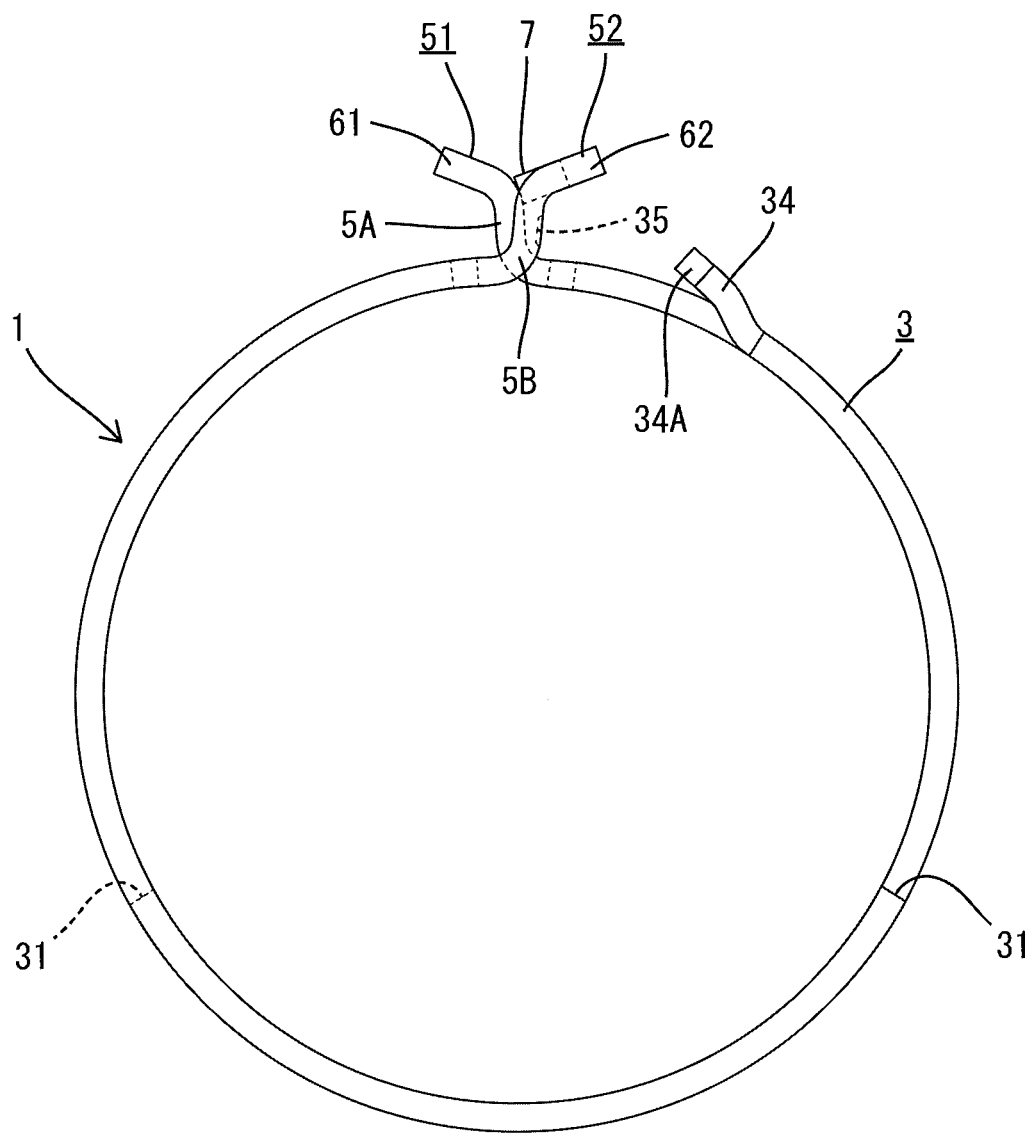
FIG. 11 is a front view of the hose clamp, showing the state where the diameter expanding is limited by a limiting piece.
Figure 12:
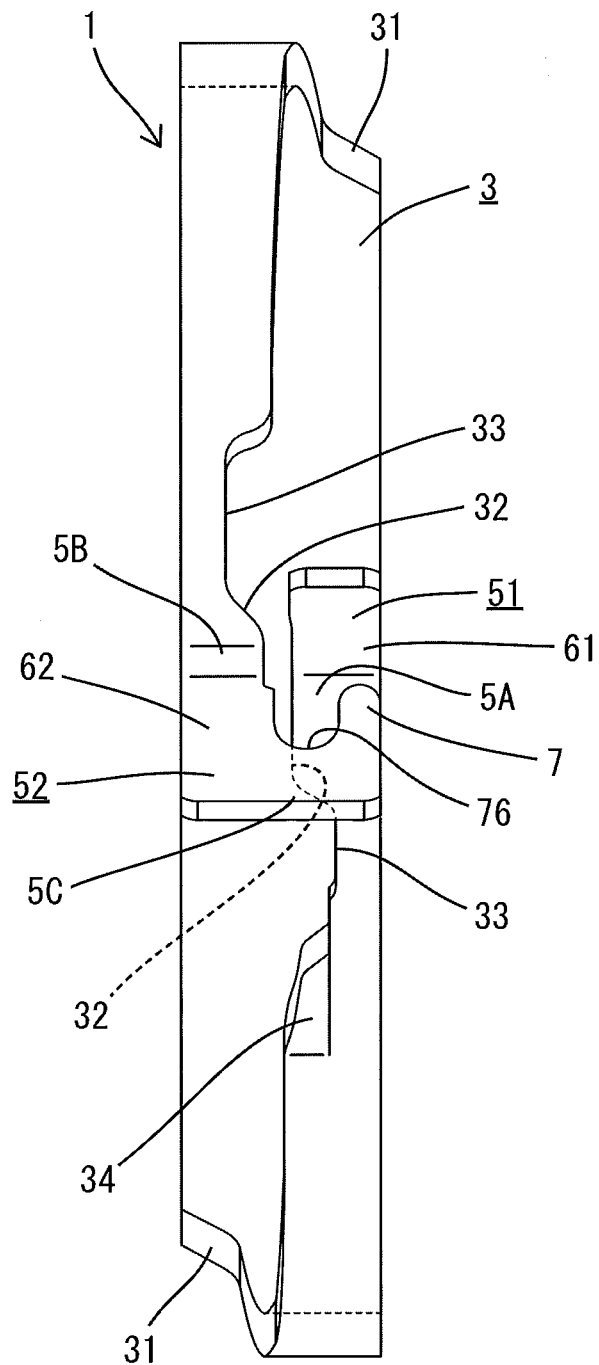
FIG. 12 is a plan view of the hose clamp.

Furthermore, an enlarged-width portion 5C extends widthwise (in the direction toward side edge at the reduced-width side) from a distal end of the second raised portion 5B. The enlarged-width portion 5C has an extending end which is turned back to be formed into a limiting piece 7. Thus, a width of the distal end of the second grip tab 52, that is, a width (the dimension designated by reference symbol W2 in FIG. 10) of a part extending from the outer edge of the second raised portion 5B to the outer edge of the limiting piece 7 are larger than a width (the dimension designated by reference symbol W1 in FIG. 10) of the first grip tab 51 (W2>W1). Accordingly, in the hose clamp 1 maintained in the expanded-diameter state, the first and second grip tabs 51 and 52 have a positional relation such that the grip tabs 51 and 52 overlap with respect to a widthwise direction in a planar view, as shown in FIG. 4. In the embodiment, the first grip tab 51 is configured to be located within a range of the width of the second grip tab 52.

When the first and second grip tabs 51 and 52 are gripped while the hose clamp 1 is in the expanded-diameter state, the limiting piece 7 abuts against the first grip tab 51 thereby to prevent further gripping operation. When the limiting piece 7 abuts against the first grip tab 51, the locking claw 34 is released from the locking by the catch 35. With this, the sliding contact of the sliding guide edges 32 of both recesses 33 moves both ends of the hose clamp 1 axially (the direction in which the grip tabs 51 and 52 depart away from each other), so that the locking claw 34 can be displaced axially outward with respect to the second grip tab 52.

In the embodiment, furthermore, a second bent portion 62 is formed by bending an entire width range from the distal end of the second raised portion 5B to the limiting piece 7 circumferentially outward (the direction opposite to the first grip tab 51) substantially at a right angle (precisely, at a slightly obtuse angle). Furthermore, the limiting portion 7 is formed by turning back from the second raised portion 5B via the enlarged-width portion 5C into a U-shape, whereby a guide groove 76 is formed between the limiting piece 7 and the second raised portion 5B. The guide groove 76 is open to the first grip tab 51 side. The guide groove 76 has a groove width slightly larger than a thickness of the locking claw 34. The guide groove 76 is configured to allow the distal end of the locking claw 34 to pass therethrough in the course of transition of the clamp body 3 to the reduced-diameter state with the release of the clamp body 3 from the expanded-diameter state. More specifically, the axial movement of the locking claw 34 is limited by surfaces of the second raised portion 5B and the limiting surface 7 opposed to each other when the clamp body 3 transfers to the reduced-diameter state. Accordingly, the clamp body 3 is configured to be able to perform the diameter reducing operation in the normal state without distortion thereof by guiding the diameter-reducing operation. In this case, since a distal end of the locking claw 34 is formed with a tapered surface 34A, the locking claw 34 can be guided into the guide groove 76.

Figure 13:
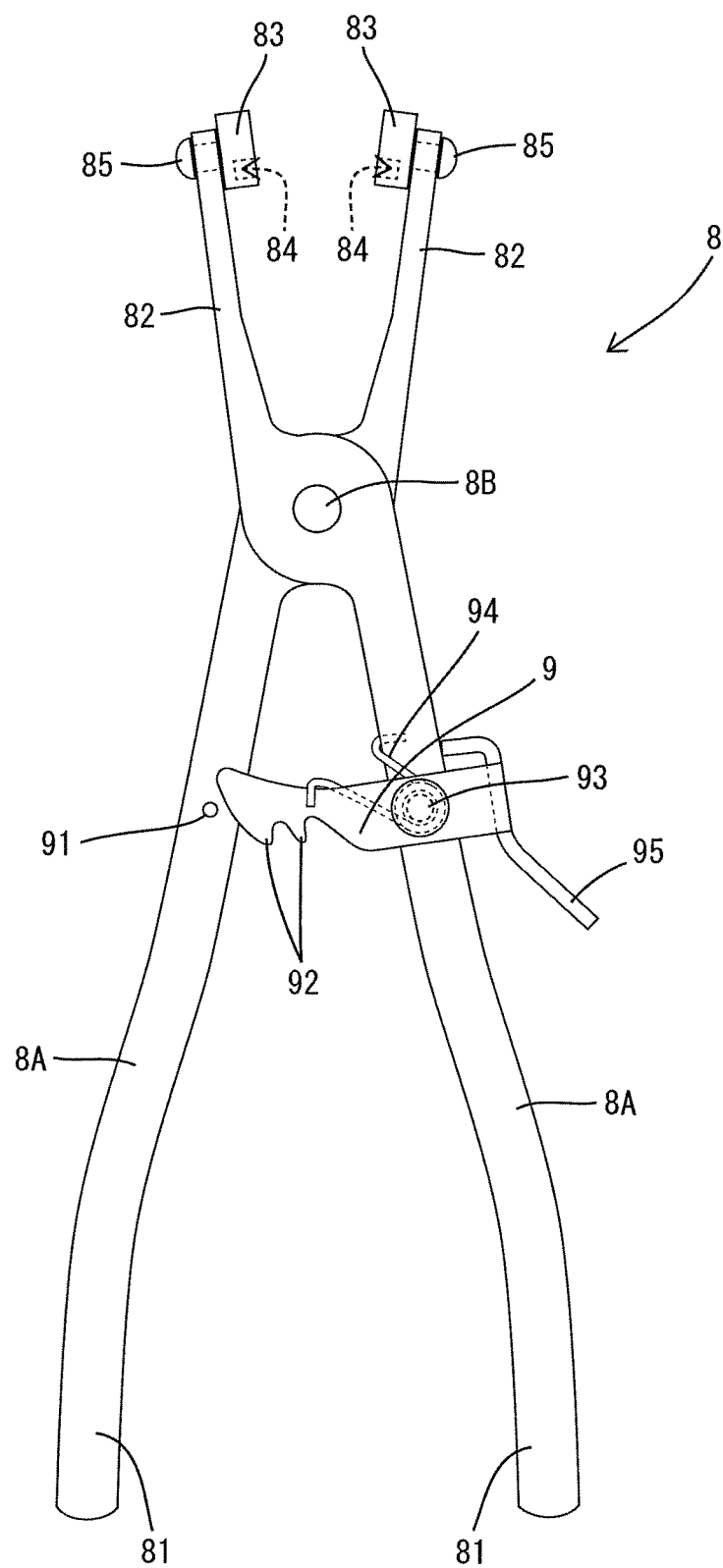
FIG. 13 is a front view of a gripping tool.
Figure 14:
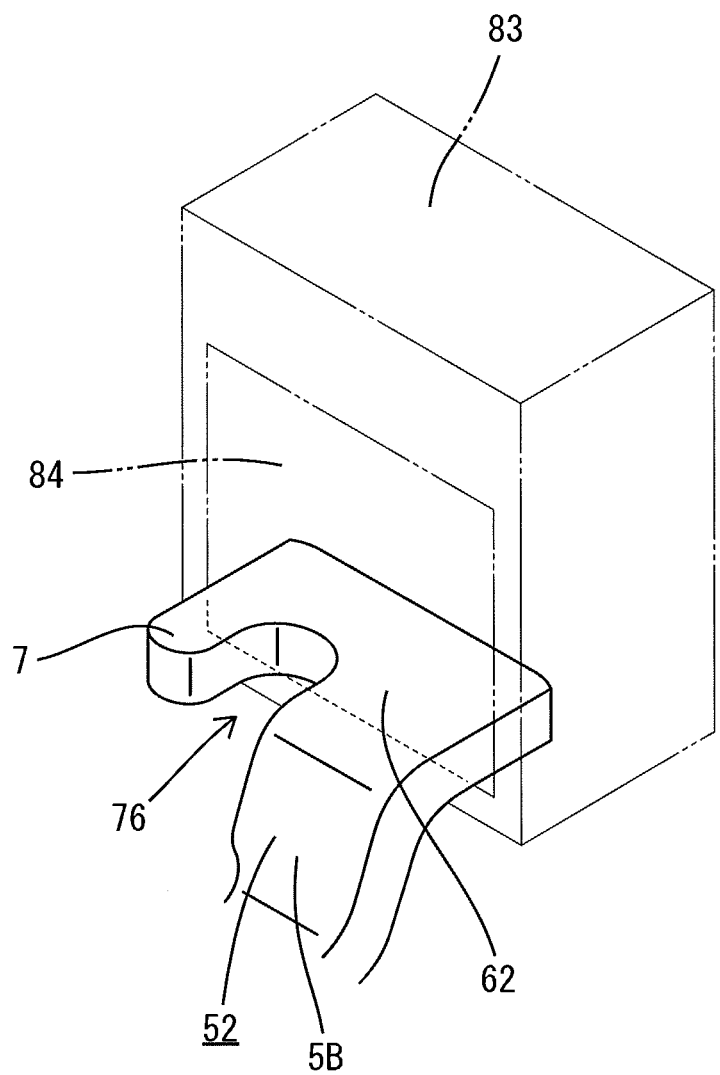
FIG. 14 is an enlarged perspective view of the hose clamp, showing the state where a bent portion of the second grip tab has been inserted into a positioning recess of the gripping tool.

A gripping tool 8 for use with the aforementioned hose clamp 1 will now be described (see FIGS. 13 and 14). The gripping tool 8 has a pair of arm members 8A which are rotatably connected to each other by a connecting pin 8B at the distal end side. Each one of the arm members 8A has two ends and the one end side thereof serves as an operating portion 81. The other end side of each arm member 8A serves as a gripping portion 82. The gripping portions 82 have opposite surfaces which are opposed to each other and are formed with grip blocks 83, respectively. The grip blocks 83 are located at distal ends of the gripping portions 82 and mounted on mounting shafts 85 so as to be rotatable about the mounting shafts 85, respectively. Furthermore, the grip blocks 83 have opposite surfaces which are opposed to each other and formed with positioning recesses 84, respectively, as shown in FIG. 14. Both positioning recesses 84 are formed into a substantially square shape and have respective sides formed to be slightly larger than a width of the bent portion 62 of the second grip tab 52. A distal end of the bent portion 62 of the second grip tab 52 can be inserted into the positioning recess 84 to a predetermined depth thereby to be positioned.

Furthermore, one arm member 8A (the right arm member 8A in FIG. 13) is provided with a locking claw 9 with a release lever 95 formed integrally with the locking claw 9. The other arm member 8A is mounted with a locking pin 91 on which the locking claw 9 is caught. A constant distance can be maintained between both grip blocks 83. More specifically, the hose clamp 1 can be retained in the expanded-diameter state with a predetermined diameter.

In more detail, the locking claw 9 is rotatably mounted on a support pin 93 further mounted on one arm member 8A, and a torsion spring 94 is wound on the support pin 93. The torsion spring 94 has two ends and is locked to the arm member 8A at the one end side and mounted to the locking claw 9 at the other end side. As a result, the locking claw 9 is biased in a direction such that it is locked by the locking pin 91. Furthermore, the locking claw 9 has a distal end formed with two saw-toothed claws 92. The claws 92 and the locking pin 91 form a ratchet mechanism in which the claws 92 are selectively locked by the locking pin 91. As a result, a space between the gripping blocks 83 is adjustable in two stages (a first position and a second position), so that the inner diameter of the hose clamp 1 in the expanded-diameter state is selectable in two stages.

In this regard, however, in the case where both arm members 8A are gripped so that the locking pin 91 is locked by the claw 92 located at the distal end side (the first position) of both claws 92, a space between both grip blocks 83 is set to be substantially equal to a space between the distal ends of bent portions 61 and 62 of both grip tabs 51 and 52 in the expanded-diameter state. Accordingly, when the gripping tool 8 is locked at the first position, the hose clamp 1 can be maintained in the expanded-diameter state without release.

Furthermore, the second position at which the claw 92 located at the proximal end side of both claws 92 is locked by the locking pin 91 is selected when a larger-diameter hose clamp is applied to a larger-diameter hose.

The working and advantageous effects of the embodiment thus constructed will now be described. Firstly describing a work to connect a hose to piping, distal ends of the bent portions 61 and 62 of the first and second grip tabs 51 and 52 are inserted into the positioning recesses 84 of both grip blocks 83 respectively while the operating portion 81 of the gripping tool 8 is being gripped. In this case, since the widths of the positioning recesses 84 are substantially equal to the width of bent portion 62 of the second grip tab 52 although larger than the width of the bent portion 61 of the second grip tab 51, the distal ends of the bent portions 61 and 62 are inserted into the positioning recesses 84 while the second grip tab 52 is positioned in the widthwise direction. The operating portion 81 of the gripping tool 8 is then gripped so that the claw 92 located at the distal end side of the locking claw 9 is caught onto the locking pin 91 using the ratchet mechanism. As a result, an operator can hold the hose clamp 1 by the gripping tool 8 locked at the first position. In this case, as described above, the hose clamp 1 is retained in the expanded-diameter state by the expanded-diameter state retainer, and accordingly, the operator can safely fit the hose clamp onto the hose from an end of the hose.

The hose clamp 1 maintained in the aforementioned state is moved to the connecting part of the hose to the piping (not shown) after the hose has been inserted onto the piping. Subsequently, when the operating portions 81 of the gripping tool 8 are gripped, the locking claw 9 is released from the locking by the lock pin 91 by the action of the ratchet mechanism.

Both arm members 8A are gripped until the limiting piece 7 abuts against the first grip tab 51, so that the hose clamp 1 is released from the expanded-diameter state. In the meantime, the distal ends of the bent portions 61 and 62 of the first and second grip tabs 51 and 52 are inserted into the respective positioning recesses 84 and the second grip tab 52 is formed to have substantially the same width as the positioning recesses 84. Accordingly, since the hose clamp 1 is prevented from displacement relative to the gripping portions 82, the first and second grip tabs 51 and 52 can be gripped while the hose clamp 1 is maintained in a stable posture.

When both grip tabs 51 and 52 thus come close to each other, the limiting piece 7 abuts against the first grip tab 51. In the meantime, the locking claw 34 is released from the locking by the catch 35 and both sliding guide edges 32 at the first grip tab 51 side and at the second grip tab 52 side slide on each other. The first grip 51 side and the second grip 52 side are then displaced to depart in the axial direction of the clamp body 3. As a result, the locking claw 34 is displaced axially outward relative to the second grip tab 52. When the grip force applied to the gripping tool 8 is reduced, the elasticity of the hose clamp 1 causes it to displace into a reduced-diameter direction. The claw 92 is locked by the locking pin 91 by the action of the torsion spring 94 during the displacement into the reduced-diameter direction, and the hose clamp 1 is once held in the midway reduced-diameter state with the gripping tool 8 being located at the first position. Subsequently, the diameter reduction of the hose clamp 1 can be restarted when the release lever 95 is operated to release the claw 92 from the locked state by the locking pin 91. As the result of the diameter reduction, the connecting part of the hose and the piping is clamped. The diameter reduction also can be carried out by operating the release lever 95 simultaneously with the diameter reduction while the claw 92 is avoided from being locked by the locking pin 91, depending on the situation.

The following advantageous effects can be achieved from the hose clamp 1 of the embodiment.

(1) The first and second grip tabs 51 and 52 have the widths set to be narrower and wider respectively in the foregoing embodiment. The reason for this is that in the case where the widths of both grip tabs are set to be wider, the first and second grip tabs 51 and 52 cross each other on the circumferential plane while being axially displaced, and are thereafter returned to the position to overlap each other in the widthwise direction when the hose clamp is annularly bent into the annular shape, as described above, with the result that the processing of axially displacing the grip tabs 51 and 52 is troublesome and the clamp body 3 is sometimes distorted. In view of this, only the second grip tab 52 side is formed to have a larger width in the embodiment, so that the clamp body 3 is prevented from distortion.

(2) From only the standpoint of avoidance of distortion, it would be better to form the first and second grip tabs 51 and 52 so that both have respective smaller widths. However, when formed in this way, the first and second grips 51 and 52 would reduce contact widths with the gripping portions 82 of the gripping tool 8 respectively with the result that the hose clamp is in an unstable gripped state. In the embodiment, however, the gripped state is easy to stabilize since the second grip tab 52 side is formed to be wider. In addition, the distal end of the second grip tab 52 is formed with the bent portion 62 which is inserted into the positioning recess 84 of the gripping tool 8 with the substantially same width. Accordingly, positional displacement can reliably be prevented. Consequently, the hose clamp 1 can be gripped in a stable posture by the gripping tool 8.

(3) When the hose clamp 1 is to be released from the expanded-diameter state, both grip tabs 51 and 52 only need to be gripped so that the limiting piece 7 is caused to abut against the first grip tab 51. Strictly speaking, the hose clamp 1 has been released from the expanded-diameter state before the limiting piece 7 abuts against the first grip tab 51. However, the hose clamp 1 has surely been released from the expanded-diameter state when the limiting piece 7 is in abutment against the first grip tab 51. Accordingly, the worker is not required to be skillful in the release of the hose clamp 1 from the expanded-diameter state since the abutment of the limiting piece 7 against the first grip tab 51 guarantees the release of the hose clamp 1 from the expanded-diameter state. Furthermore, an excessive gripping operation can also be prevented by the abutment of the limiting piece 7 against the first grip tab 51.

(4) The limiting piece 7 is formed on the second grip tab 52 located at the wider side in the foregoing embodiment. That is, since the second grip tab 52 easily ensures a widthwise dimension required to provide the limiting piece 7, the hose clamp 1 is advantageous in that the freedom in the design for provision of the limiting piece 7 is increased.

(5) In the formation of the limiting piece 7, the guide groove 76 is configured to be formed between the limiting piece 7 and the second raised portion 5B. The guide groove 76 formed in this way guides the locking claw 34 passing therethrough in the course of transition of the hose clamp 1 from the expanded-diameter state to the reduced-diameter state, with the result that the locking claw 34 can be displaced along a normal path. Accordingly, since the hose clamp 1 is turned into the reduced-diameter state without distortion, the hose can be clamped in the normal state, namely, without reduction in the sealing performance due to distortion.

Other Embodiments

The present invention should not be limited to the embodiment described above with reference to the drawings. The technical scope of the invention encompasses the following embodiments, for example.

(1) In the foregoing embodiment, since the inner diameter of the clamp body 3 is set to be larger than the outer diameter of the counterpart to be clamped (a hose) in the expanded-diameter state, the hose clamp 1 can be inserted onto the hose without any change. However, an inner diameter of the clamp body 3 in the expanded-diameter state may be set to be smaller than the outer diameter of the counterpart.

As a result, when this case is compared with the case where the inner diameter of the clamp body 3 in the expanded-diameter state is set to be larger than the outer diameter of the counterpart, the stress acting on the clamp body 3 is reduced. This can achieve an advantageous effect that permanent set in fatigue of the hose clamp 1 can be alleviated.

When the above-mentioned setting is employed, the hose clamp 1 in the expanded-diameter state needs to be gripped with the gripping tool 8 in order to be once released from the expanded-diameter state and further needs to be expanded to such an inner diameter as to be insertable onto the hose. In this case, when the claw 92 of the locking claw 9 with the release lever 95 is caught on the locking pin 91 using the gripping tool 8, the clamp body 3 can be locked with the inner diameter capable of inserting the clamp body 3 onto the hose without any change. Accordingly, the hose clamp 1 can smoothly be inserted onto the hose as ever.

(2) Although the locking claw 34 is formed on the circumferential surface of the clamp body 3 in the foregoing embodiment, various types of expanded-diameter state retainers are considered. For example, the locking side may be formed on one of the first and second grip tabs 51 and 52, and the catching side may be formed on the other.

(3) Although the limiting piece 7 is formed on the second grip tab 52 located at the wider side in the foregoing embodiment, the limiting piece 7 may be formed on the first grip tab 51 located at the narrower side.

(4) Although the hose clamp is set so as not to be released from the expanded-diameter state in the foregoing embodiment when the gripping tool is located at the first position, the hose clamp may be set to be released from the expanded-diameter state, instead. In this case, the hose clamp is maintained in the released state by the gripping tool. Work safety can be ensured since the claw 92 of the locking claw 9 and the locking pin 91 are locked at the first position while being biased in the locking direction by the spring force of the torsion spring 94.

(5) Although the hose clamp 1 is fitted onto from the end of the hose in the foregoing embodiment while being held in the expanded-diameter state by the gripping tool 8, the hose clamp 1 in the expanded-diameter state may be fitted onto the hose manually or by other means and thereafter be held by the gripping tool 8, instead. Furthermore, the hose clamp 1 which has been fitted onto the hose to be held at a predetermined connecting part in the expanded-diameter state may be operated with the gripping tool 8 thereby to be released from the expanded-diameter state.

EXPLANATION OF REFERENCE SYMBOLS

1 . . . hose clamp
3 . . . clamp body
7 . . . limiting piece
8 . . . gripping tool
32 . . . sliding guide edge
34 . . . locking claw (expanded-diameter state retainer)
34A . . . tapered surface
35 . . . catch (expanded-diameter state retainer)
51 . . . first grip tab
52 . . . second grip tab
61 . . . first bent portion
62 . . . second bent portion
76 . . . guide groove

The invention claimed is:

1. A hose clamp comprising:
a clamp body formed by bending a plate spring into an annular shape while two ends of the plate spring are caused to cross on a circumferential plane;
grip tabs formed to be raised radially outward from both ends of the clamp body, respectively; and
an expanded-diameter state retainer which is formed integrally on the clamp body or the grip tabs and is capable of retaining an expanded-diameter state of the clamp body and releasing the clamp body from the expanded-diameter state by relative movement of both grip tabs in an axial direction of the clamp body with a gripping operation applied to both grip tabs,
wherein the grip tabs have respective distal ends, one of which has a larger width than the other, the distal ends being bent circumferentially outward into bent portions spaced from each other, the bent portions being configured as to be insertable into positioning recesses formed in opposite surfaces of a gripping tool, respectively,
wherein one of the grip tabs is formed with a limiting piece directed toward the other grip tab, the limiting piece being configured to abut against the other grip tab while the clamp body is releasable from the expanded-diameter state by way of the expanded-diameter state retainer,
wherein the limiting piece is formed on the grip tab with the wider distal end, and
wherein:
the expanded-diameter state retainer includes:
a locking claw which is formed on a part of the clamp body so as to protrude radially outward, the part being located near the end of the clamp body at the side where the grip tab with the narrower distal end is formed; and a catch formed on a raised portion raised radially outward from the clamp body in the grip tab with the wider distal end, the catch releasably locking the locking claw, thereby retaining the expanded-diameter state of the clamp body;

the grip tab with the wider distal end extends in a widthwise direction from a distal end of the raised portion and includes an extending end which is bent toward the grip tab with the narrower distal end thereby to be formed into the limiting piece;

a guide groove is formed between the raised portion and the limiting piece so as to be open to the grip tab with the narrower distal end; and the guide groove is configured to be capable of guiding a diameter-reducing operation of the clamp body by allowing a distal end of the locking claw to pass therethrough in transition of the clamp body from the expanded-diameter state to a reduced-diameter state.

2. The hose clamp according to claim 1, wherein the clamp body in the expanded-diameter state has an inner diameter smaller than an outer diameter of a counterpart to be clamped.

3. A hose clamp comprising:

a clamp body formed by bending a plate spring into an annular shape while two ends of the plate spring are caused to cross on a circumferential plane;

grip tabs formed to be raised radially outward from both ends of the clamp body, respectively; and an expanded-diameter state retainer which is formed integrally on the clamp body or the grip tabs and is capable of retaining an expanded-diameter state of the clamp body and releasing the clamp body from the expanded-diameter state by relative movement of both grip tabs in an axial direction of the clamp body with a gripping operation applied to both grip tabs, wherein:

one of the grip tabs has a distal end formed to be wider than a distal end of the other grip tab; and the distal ends of the grip tabs are bent in respective directions that the distal ends depart from each other with respect to a thicknesswise direction, thereby serving as bent portions for the gripping operation, respectively, wherein one of the grip tabs is formed with a limiting piece directed toward the other grip tab, the limiting piece being configured to abut against the other grip tab while the clamp body is releasable from the expanded-diameter state by way of the expanded-diameter state retainer, wherein the limiting piece is formed on the grip tab with the wider distal end, and wherein:

the expanded-diameter state retainer includes:

a locking claw which is formed on a part of the clamp body so as to protrude radially outward, the part being located near the end of the clamp body at the side where the grip tab with the narrower distal end is formed; and a catch formed on a raised portion raised radially outward from the clamp body in the grip tab with the wider distal end, the catch releasably locking the locking claw, thereby retaining the expanded-diameter state of the clamp body;

the grip tab with the wider distal end extends in a widthwise direction from a distal end of the raised portion and includes an extending end which is bent toward the grip tab with the narrower distal end thereby to be formed into the limiting piece;

a guide groove is formed between the raised portion and the limiting piece so as to be open to the grip tab with the narrower distal end; and the guide groove is configured to be capable of guiding a diameter-reducing operation of the clamp body by allowing a distal end of the locking claw to pass therethrough in transition of the clamp body from the expanded-diameter state to a reduced-diameter state.

4. The hose clamp according to claim 3, wherein the clamp body in the expanded-diameter state has an inner diameter smaller than an outer diameter of a counterpart to be clamped.

* * * * *